US007272756B2

(12) United States Patent
Brink et al.

(10) Patent No.: US 7,272,756 B2
(45) Date of Patent: Sep. 18, 2007

(54) EXPLOITIVE TEST PATTERN APPARATUS AND METHOD

(75) Inventors: Robert D. Brink, Coopersburg, PA (US); James Walter Hofmann, Jr., Lansdale, PA (US); Max J. Olsen, Mertztown, PA (US); Gary E. Schiessler, Allentown, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 169 days.

(21) Appl. No.: 11/121,152

(22) Filed: May 3, 2005

(65) Prior Publication Data

US 2006/0253748 A1    Nov. 9, 2006

(51) Int. Cl.
*G01R 31/28* (2006.01)
(52) U.S. Cl. ............ 714/715; 714/713; 714/716; 714/724; 714/733; 714/734; 714/738; 714/739; 714/25; 714/30; 375/224; 375/221
(58) Field of Classification Search ............... None
See application file for complete search history.

(56) References Cited

U.S. PATENT DOCUMENTS

| | | | |
|---|---|---|---|
| 5,163,057 A | 11/1992 | Grupp | |
| 5,282,211 A | 1/1994 | Manlick et al. | |
| 5,392,314 A | 2/1995 | Wolf | |
| 5,592,674 A | 1/1997 | Gluska et al. | |
| 5,726,991 A * | 3/1998 | Chen et al. | 714/704 |
| 5,991,344 A | 11/1999 | Fujii et al. | |
| 6,032,282 A | 2/2000 | Masuda et al. | |
| 6,201,829 B1 * | 3/2001 | Schneider | 375/221 |
| 6,363,060 B1 | 3/2002 | Sarkar | |
| 6,373,861 B1 | 4/2002 | Lee | |
| 6,498,929 B1 | 12/2002 | Tsurumi et al. | |
| 6,553,529 B1 | 4/2003 | Reichert | |
| 6,684,350 B1 | 1/2004 | Theodoras, II et al. | |
| 6,834,367 B2 * | 12/2004 | Bonneau et al. | 714/738 |
| 6,865,660 B2 | 3/2005 | Duncan | |
| 6,977,960 B2 * | 12/2005 | Takinosawa | 375/224 |

(Continued)

FOREIGN PATENT DOCUMENTS

WO    WO 2005/015248    2/2005

OTHER PUBLICATIONS

"IA Title: Common Electrical I/O (CEI)—Electrical and Jitter Interoperability Agreements for 6G+ bps and 11G+ bps I/O," Implementation Agreement OIF-CEI-01.0, Optical Internetworking Forum—Clause 0: Document Structure and Contents, pp. 33-86 (Dec. 13, 2004).*

(Continued)

*Primary Examiner*—Cynthia Britt
*Assistant Examiner*—John P Trimmings

(57) ABSTRACT

Communications equipment can be tested using a test pattern that is modified compared to, and more exploitive than, a standard test pattern. Test patterns can be employed that have lengthened or shortened consecutive identical digit (CID) portions, or that have lengthened or shortened pseudo random bit sequence (PRBS) portions. In some cases, PRBS polynomials are not re-seeded after each CID. Further, different order polynomials can be employed for different applications. Exemplary applications can include test equipment and built-in self-test capability for integrated circuits.

15 Claims, 3 Drawing Sheets

U.S. PATENT DOCUMENTS

| | | | |
|---|---|---|---|
| 7,062,696 | B2 | 6/2006 | Barry et al. |
| 7,093,172 | B2* | 8/2006 | Fan et al. ............ 714/716 |
| 7,111,208 | B2* | 9/2006 | Hoang et al. ............ 714/716 |
| 2004/0003331 | A1 | 1/2004 | Salmon et al. |
| 2004/0015761 | A1 | 1/2004 | Klotz et al. |
| 2004/0052521 | A1 | 3/2004 | Halgren et al. |
| 2004/0177301 | A1 | 9/2004 | Tarango et al. |
| 2005/0076280 | A1* | 4/2005 | Martinez ............ 714/733 |
| 2005/0086563 | A1 | 4/2005 | Carballo |
| 2005/0166110 | A1 | 7/2005 | Swanson et al. |
| 2005/0238127 | A1 | 10/2005 | Naffziger et al. |
| 2005/0249001 | A1 | 11/2005 | Tanaka et al. |
| 2005/0270870 | A1 | 12/2005 | Shin et al. |
| 2006/0010358 | A1 | 1/2006 | Miller |
| 2006/0010360 | A1 | 1/2006 | Kojima |
| 2006/0156134 | A1 | 7/2006 | Mukherjee et al. |
| 2006/0203725 | A1 | 9/2006 | Paul et al. |
| 2006/0248424 | A1 | 11/2006 | Colunga et al. |

OTHER PUBLICATIONS

"Annex A Test Bit Sequence," Methodology for Jitter and Signal Quality☐☐ Specification-MJSQ Technical Report REV 10.0, pp. 117-132 (Mar. 10, 2003).*

"Series O: Specifications of Measuring Equipment; Equipment for the Measurement of Digital and Analogue/Digital Parameters; General Requirements for Instrumentation for Performance Measurements on Digital Transmission Equipment; Corrigendum 1," ITU-T 0.150 Corrigendum I, all pages (May 2002).*

Brink et al., "Offset Test Pattern Apparatus and Method," U.S. Appl. No. 11/121,164 (May 3, 2005).

"Annex A Test Bit Sequence," Methodology for Jitter and Signal Quality Specification-MJSQ Technical Report REV 10.0, pp. 117-132 (Mar. 10, 2003).

"IA Title: Common Electrical I/O (CEI)—Electrical and Jitter Interoperability Agreements for 6G+ bps and 11G+bps I/O," Implementation Agreement OIF-CEI-01.0, Optical Internetworking Forum—Clause 0: Document Structure and Contents, pp. 33-86 (Dec. 13, 2004).

"Series O: Specifications of Measuring Equipment; Equipment for the Measurement of Digital and Analogue/Digital Parameters; General Requirements for Instrumentation for Performance Measurements on Digital Transmission Equipment," ITU-T0.150, all pages (May 1996).

"Series O: Specifications of Measuring Equipment; Equipment for the Measurement of Digital and Analogue/Digital Parameters; General Requirements for Instrumentation for Performance Measurements on Digital Transmission Equipment; Corrigendum 1," ITU-T 0.150 Corrigendum 1, all pages, (May 2002).

"Fibre Channel; Framing and Signaling (FC-FS) REV 1.80," INCITS Working Draft Proposed American National Standard for Information Technology, pp. 1-79, 574-595 (Mar. 26, 2003).

"Serial ATA: High Speed Serialized AT Attachment," Serial ATA Workshop, Rev. 1.0a, pp. 128-133 (Jan. 7, 2003).

* cited by examiner

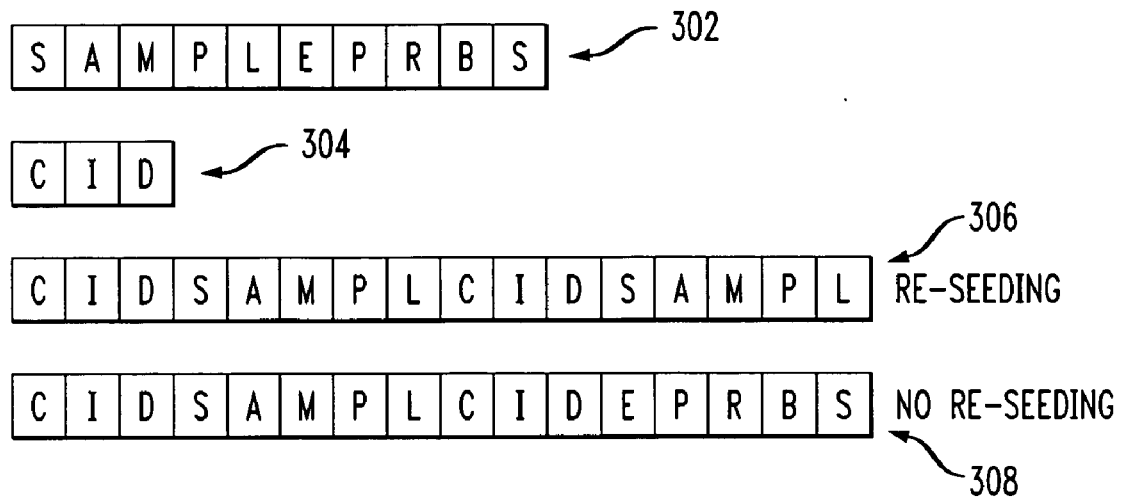
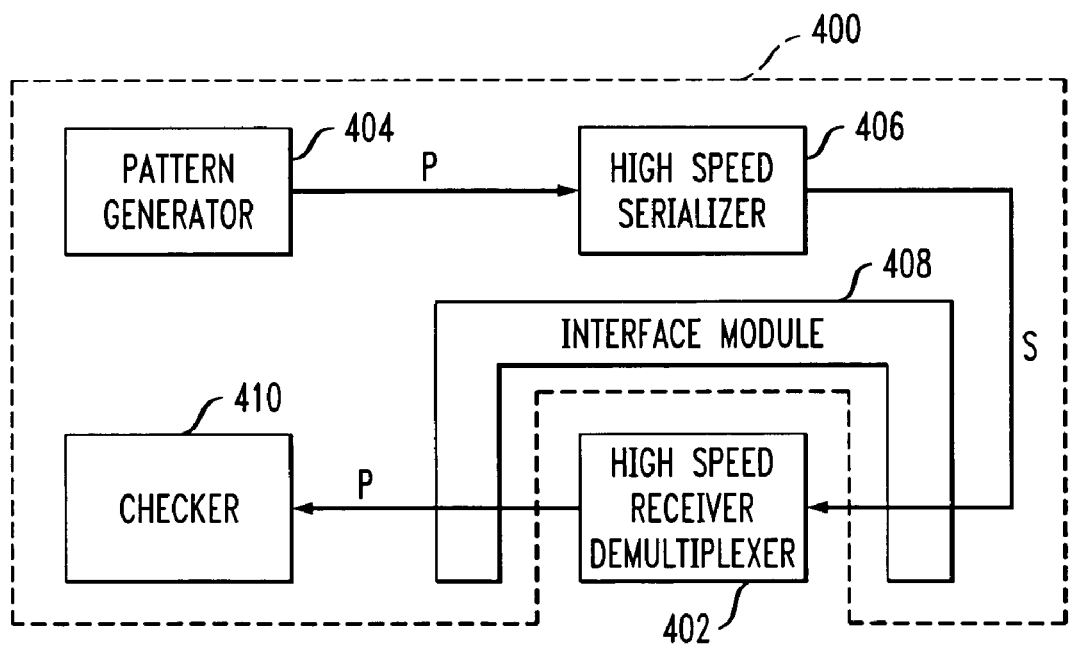

EXPLOITIVE TEST PATTERN APPARATUS AND METHOD

FIELD OF THE INVENTION

The present invention relates to communications systems, and more particularly relates to an apparatus and method for generating an exploitive test pattern for testing such equipment.

BACKGROUND OF THE INVENTION

Communications equipment must typically be tested in order to verify proper performance. Such testing can include, for example, development testing, wherein proper functioning of a prototype of a candidate design is verified; acceptance testing, where it is confirmed that an individual component or piece of equipment functions according to specifications; or ongoing field tests, where correct functioning of equipment in the field is monitored. Such testing may be performed, for example, by external test equipment or by built-in self-test (BIST) capability.

One manner of testing communications equipment is to subject the equipment to test patterns that simulate the type of data that the equipment will be handling in use. For example, the Optical Internetworking Forum (OIF) document entitled "Common Electrical I/O (CEI)—Electrical and Jitter Interoperability agreements for 6G+ bps and 11G+ bps I/O," numbered IA # OIF-CEI-01.0, and dated Dec. 13, 2004, specifies a Jitter Tolerance Pattern having a 72 zero consecutive identical digit (CID) portion. followed by at least 10328 bits of a standard pseudo random bit sequence (PRBS) polynomial designated as PRBS31, with an appropriate seed (all ones). This is followed by a complementary portion, i.e., a CID portion of 72 ones and the complement of the PRBS bits, again with appropriate seeding (all ones and thus not complementary to the first seed). The PRBS31 polynomial is specified in International Telecommunication Union ITU-T 0.150 section 5.8. The fixed patterns specified in standards such as those just mentioned may have limited diagnostic value under certain conditions; the specified Jitter Tolerance Pattern is relatively low density and has a no-activity CID.

Accordingly, it would be desirable to provide an apparatus and method where more flexible test patterns can be employed. Such patterns can be more exploitive than a fixed standard pattern, that is, they can subject the equipment under test to more difficult conditions than standard patterns, and thus enhance error diagnostic capabilities; for example, with respect to tolerance of jitter.

SUMMARY OF THE INVENTION

An illustrative method of generating a modified test pattern for testing communications equipment, according to one aspect of the invention, can include the steps of generating a test CID portion comprising n consecutive identical bits; and generating a test PRBS portion comprising q bits of a test PRBS. At least one of the test CID portion and the test PRBS portion is modified with respect to a baseline pattern having a baseline consecutive identical digit (CID) portion with m consecutive identical bits and a baseline PRBS portion with p bits of a baseline PRBS. The modification is such as to enhance diagnostic value of the modified test pattern with respect to the baseline pattern.

In another aspect, one exemplary embodiment of an apparatus for testing a communications device can include a pattern generator that is configured to generate the test CID portion and the test PRBS portion, a checker that is configured to measure performance of the communications device when exposed to the test pattern generated by the pattern generator, and an interface module that is configured to couple the communications device to the pattern generator and the checker.

In yet another aspect, an apparatus according to another exemplary embodiment of the present invention can be configured to provide BIST capability to a communications circuit, device, or component, such as, for example, an integrated circuit.

In yet a further aspect, a data structure is provided encompassing suitable test patterns.

A more complete understanding of the present invention, as well as further features and advantages of the present invention, will be obtained by reference to the following detailed description and drawings.

BRIEF DESCRIPTION OF THE DRAWINGS

FIG. 3 depicts test patterns with and without re-seeding;

FIG. 4 depicts an exemplary embodiment of an apparatus for testing a communications device according to an aspect of the present invention.

DETAILED DESCRIPTION

Figure 1:
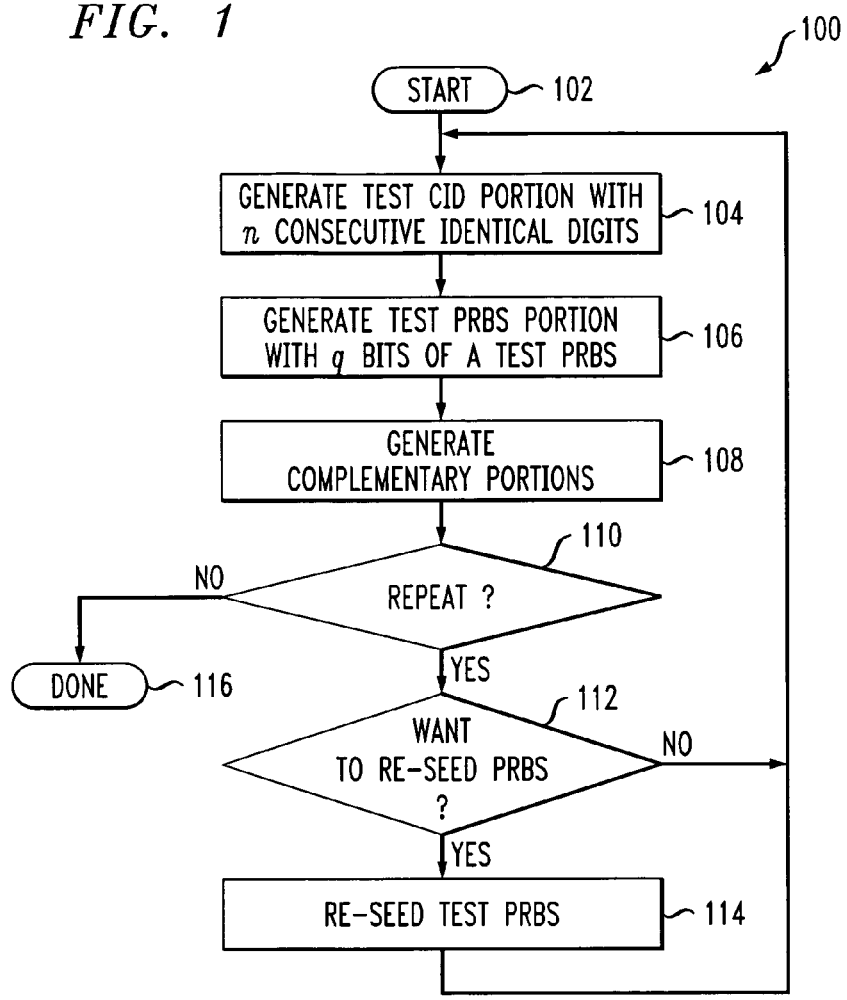
FIG. 1 is a flow chart depicting exemplary method steps for generating an exploitive test pattern in accordance with an aspect of the present invention.

Reference should now be had to FIG. 1, which depicts a flow chart 100 illustrating steps of an exemplary method for generating a test pattern according to one aspect of the present invention. After starting at block 102, the method can include the step 104 of generating a test CID portion with n consecutive identical digits, and the step 106 of generating a test PRBS portion with q bits of a test PRBS. Typical test patterns include complementary portions following the first CID and PRBS, with bits that are the complements of the first CID and PRBS; such complementary portions can be generated as at block 108. At block 110, a decision can be made whether additional occurrences of the test pattern should be generated; typically, this is the case until such time as a given test is complete.

Appropriate seeding can be carried out as desired; such seeding can correspond, for example, to the re-setting of shift registers producing the PRBS to appropriate initial values. In certain aspects of the invention, discussed further below, it is desirable not to re-seed the PRBS; accordingly, at decision block 112, a decision can be made whether to re-seed the PRBS, and if such is appropriate, the test PRBS can be re-seeded at block 114. If no further occurrences of the test pattern are needed, rather than making the re-seeding decision at block 112, the process is done for the time being, as at block 116.

Figure 2:
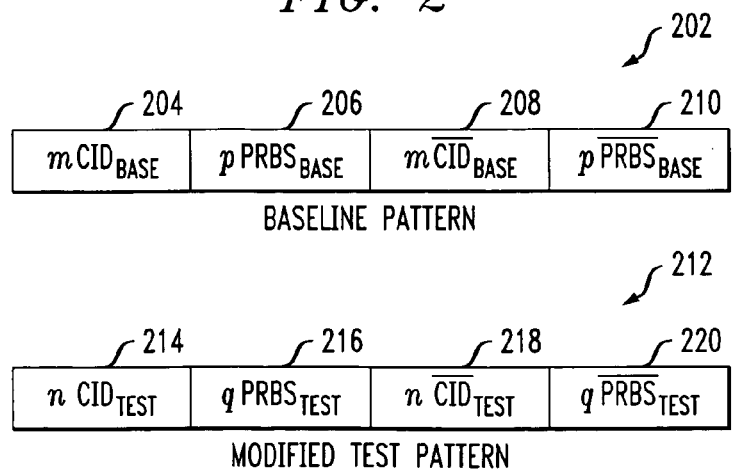
FIG. 2 depicts an exemplary modified test pattern compared to a baseline pattern.

Attention should now be given to FIG. 2, which illustrates a baseline pattern 202 and a test pattern 212, modified with respect to the baseline pattern 202. The baseline pattern includes m bits of a baseline CID portion 204 and p bits of a baseline PRBS 206, with corresponding complementary portions 208, 210. It will be appreciated that at least one of the test CID portion 214 and the test PRBS portion 216 is modified with respect to the baseline CID portion and the baseline PRBS portion, respectively, of the baseline test pattern. Such modification is performed to enhance diagnostic value of the modified test pattern with respect to the baseline pattern. For example, the modified test pattern may deliberately make clock data recovery more difficult for a receiver under test. The baseline PRBS need not be the same as the test PRBS. That is, the test PRBS portion 216 can differ from the baseline PRBS portion in length (i.e., q different than p) and/or in the PRBS that is used to generate it. The test pattern can also include appropriate complementary portions 218, 220.

The baseline pattern can be, for example, a standard pattern typically used with the type of equipment under test. Thus, again by way of example and not limitation, in applications for the physical link layers of SONET (synchronous optical network) or Fibre Channel standards, the baseline pattern can be the Jitter Tolerance Pattern described above. It should be emphasized that modification of the baseline pattern, per se, need not be part of the method; any steps of generating a test CID portion and generating a test PRBS portion that result in a test pattern that is modified with respect to a baseline pattern that can be used with the kind of equipment under test, and that is enhanced according to the criteria set forth herein, is contemplated as falling within the scope of the present invention.

A number of different types of modification of baseline test patterns have been found helpful. In one aspect of the invention, n is greater than m such that the test CID portion is longer than the baseline CID portion, and such that bit locking ability of the communications equipment can be subjected to a more rigorous test condition via the modified test pattern as compared to the baseline test pattern. In another aspect of the invention, n is less than m such that the test CID portion is shorter than the baseline CID portion, and such that the communications equipment can be subjected to a more rigorous test condition for simulation of high frequency data via the modified test pattern as compared to the baseline test pattern.

In still further aspects of possible modifications, the baseline PRBS and the test PRBS can be identical, but q can be less than p, such that the test PRBS portion is truncated with respect to the baseline PRBS portion, and such that the resulting modified test pattern provides a higher frequency toggle rate as compared to the baseline test pattern. In another possible case where the baseline PRBS and the test PRBS are identical, q can be greater than p, such that the test PRBS portion is stretched with respect to the baseline PRBS portion, and such that the resulting modified test pattern provides a more realistic test, as compared to the baseline test pattern, for conditions wherein long data frames (for example, longer than typical frames for which the baseline pattern was developed) are employed.

It will be appreciated that the test PRBS can be a lower order polynomial function than the baseline PRBS, such that the modified test pattern provides a higher frequency toggle rate as compared to the baseline test pattern. Alternatively, the test PRBS can be a higher order polynomial function than the baseline PRBS, such that the modified test pattern provides a more realistic test, as compared to the baseline test pattern, for conditions wherein long data frames are employed.

Heretofore, only the standard Jitter Tolerance Pattern described above, with standard lengths of CID and PRBS (m=72 and p greater than or equal to 10328 bits of PRBS31) has been employed with respect to the OIF standards application described above. Any of a number of different PRBS patterns can be used with the present invention. At present, it is believed that at least PRBS7, PRBS15, PRBS20, PRBS23, PRBS29, and PRBS31 are useful. The latter five patterns are defined in Section 5 of the aforementioned ITU-T 0.150 document, and Corrigendum 1 thereto. The skilled artisan will appreciate that it is convenient to define the various PRBS patterns in terms of polynomials. For example, the PRBS31 pattern can be defined in terms of the polynomial $D^{31}+D^{28}+1$. Alternatively, the various patterns can be described in terms of the shift register configuration with which they can be produced; for example, PRBS31 corresponds to the output that would be obtained from a thirty-one-stage shift register having the twenty-eighth and thirty-first stage outputs added in a modulo-two addition stage with a result of the addition being fed back to a first-stage input (note the correlation with the polynomial exponents). As used herein, including the claims, the given PRBS is intended to be covered, however produced, whether specified in polynomial form or in shift register configuration form. The polynomial representations of the patterns are summarized below:

| | |
|---|---|
| PRBS7 | $D^7 + D^6 + 1$ |
| PRBS15 | $D^{15} + D^{14} + 1$ |
| PRBS20 | $D^{20} + D^3 + 1$ |
| PRBS23 | $D^{23} + D^{18} + 1$ |
| PRBS29 | $D^{29} + D^{27} + 1$ |
| PRBS31 | $D^{31} + D^{28} + 1$ |

FIG. 3 should now be viewed in connection with further elaboration of the above discussion of re-seeding or not re-seeding the PRBS. Block 302 represents a sample PRBS, represented as the capital letters "SAMPLEPRBS." It will be appreciated that an actual PRBS will include a sequence of ones and zeroes; the aforementioned PRBS31 includes 2,147,483,647 bits and is obviously not amenable to direct illustration. Accordingly, letters rather than large bit sequences will be used for purposes of illustration. Block 304 represents a CID portion. In a case with re-seeding, as in block 306, after a first CID and a given number of bits of the PRBS (here represented as the first five letters "SAMPL"), another CID follows and the PRBS is re-seeded such that it begins at the same point and the first five letters "SAMPL" are again part of the pattern. Block 308 illustrates the situation where the PRBS is not re-seeded. After the first CID and "SAMPL" as before, following the second CID, instead of starting again from the beginning, we take the next five letters "EPRBS." It will be appreciated that in use, the CID can be any appropriate value and is not limited to a length of three, as illustrated, and the number of bits from the PRBS can also be any appropriate value and is not limited to a length of five, as illustrated. Accordingly, in yet a further aspect of the invention, the baseline pattern can encompass multiple repetitions of the baseline CID portion and the baseline PRBS portion, with the p bits identical for each repetition and resulting from a re-seeding of the baseline PRBS. One can repeat the steps of generating the test CID portion and generating the test PRBS portion, and the step of generating the test PRBS portion can be repeated without re-seeding the test PRBS. This effectively introduces randomness into the length of the test CID portion. This can be illustrated by the following example. In the case with re-seeding, assume that the CID portion is 72 zeroes, and that there is one zero in an adjacent portion of the PRBS, making a total of 73 zeroes. Since the same part of the PRBS is always adjacent the CID, there is an "effective" CID of 73 zeroes. In the case without re-seeding, different parts of the PRBS will be adjacent the 72 zero CID; sometimes there will be no adjacent zeroes, sometimes one, sometimes 2, and so on; thus, the "effective" CID will range from 72 zeroes on up.

Another aspect of the present invention is a data structure having a bit sequence corresponding to an n-bit CID portion and a q-bit PRBS portion, at least one of which is modified with respect to a baseline CID portion and a baseline PRBS portion, for example, those described in the aforementioned IA # OIF-CEI-01.0 document (m=72 and p greater than or equal to 10328 bits of PRBS31). The modification can be to enhance diagnostic value of the data structure with respect to the baseline, for example, with respect to Fibre Channel or SONET applications. In some patterns for SONET applications, the CID portion can range to as few as 8 bits or as many as 256 bits, and up to 524288 bits of the PRBS can be used. In some patterns for Fibre Channel applications, the CID portion can range to as few as 10 bits or as many as 320 bits, and up to 655360 bits of the PRBS can be used.

It will be appreciated that one or more of the above-described modifications may be applied to a given test pattern.

Reference should now be had to FIG. 4, which depicts an exemplary embodiment of an apparatus 400 for testing a communications device such as a high speed receiver demultiplexer 402. Many other types of communications devices can be tested with apparatus 400, such as deserializers, serializer/deserializers, and the like, so "communications device" should be broadly construed to encompass a variety of appropriate devices, apparatus, discrete circuits, components, integrated circuits, hybrid circuits, and so on. Apparatus 400 can include a pattern generator 404 that is configured to generate a test CID portion and a test PRBS portion as described above. Apparatus 400 can optionally include a high speed serializer 406 that receives a number of parallel bits from pattern generator 404 and generates a serial bitstream therefrom, and an interface module 408 that is configured to couple the communications device (such as receiver demultiplexer 402) to the apparatus 400. Apparatus 400 can further include a checker 410 that is configured to measure performance of the communications device (such as receiver demultiplexer 402) when exposed to the test pattern generated by the pattern generator 404; checker 410 is typically configured to receive a parallel bitstream from the communications device under test. It should be noted that throughout this application, a single channel view has been adopted for illustrative convenience; however, in typical applications, a single clock cycle will advance the pattern generator by, for example, 16 or 20 bits corresponding to the number of parallel channels.

Pattern generator 404 can advantageously be programmable to select different PRBS polynomials, different length CIDs, different length PRBS portions, and to select whether re-seeding is to be performed.

Figure 5:
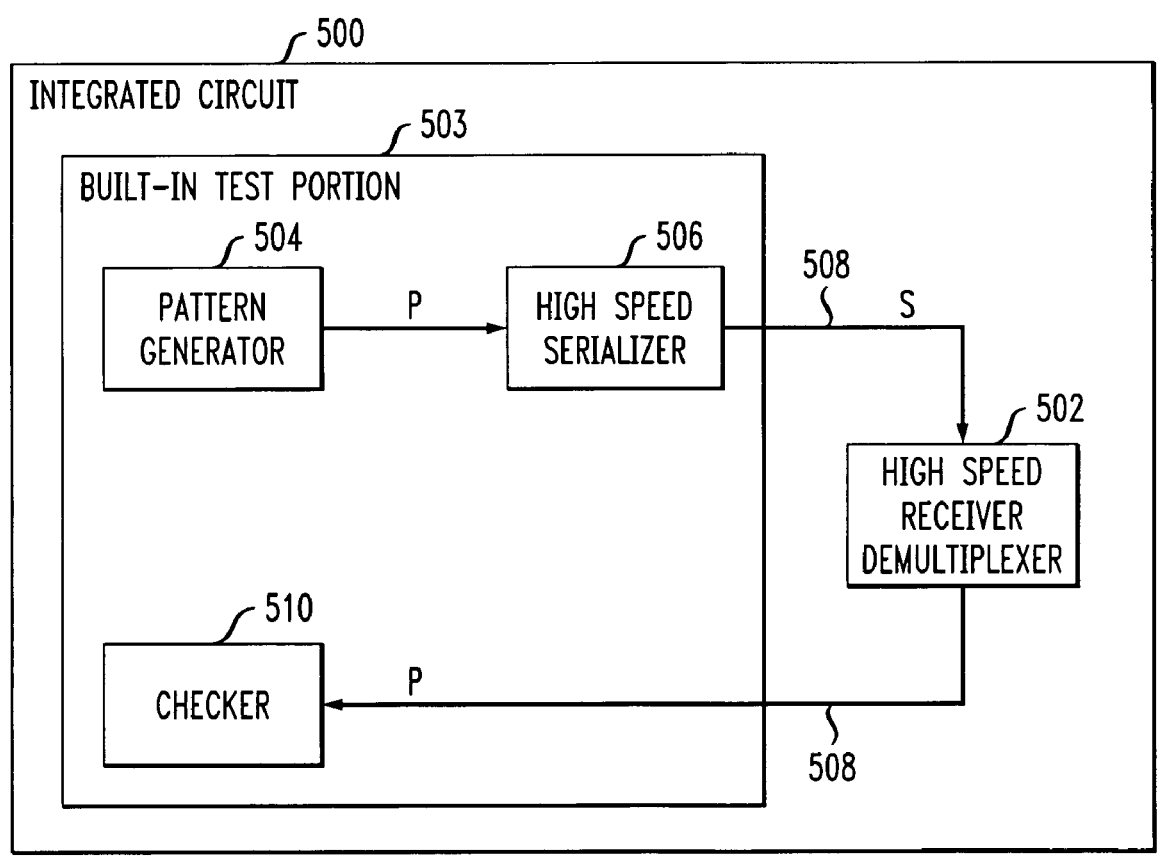
FIG. 5 depicts an exemplary integrated circuit having BIST capability according to another aspect of the present invention.

Reference should now be had to FIG. 5, which shows an exemplary embodiment of an integrated circuit 500, for communications applications, in accordance with another aspect of the present invention. Circuit 500 can include a communications portion such as high speed receiver demultiplexer 502 and a built-in test portion 503. The communications portion is not limited to high speed receiver demultiplexer 502 and can include any kind of communications functionality typically implemented on an integrated circuit; for example, a receiver, receiver functionality of a transmitter/receiver, a deserializer, or a serializer/deserializer. The built-in test portion 503 can include one or more of elements numbered 504 through 506 and 510 similar to elements 404 through 406 and 410 described with respect to FIG. 4. The communications portion can be interconnected between high speed serializer 506 and checker 510 via an interface portion; for example, by appropriate interconnections formed on integrated circuit chip 500 and suggested by arrows 508. The interface portion can, if desired, be configured to selectively interconnect the communications portion to the test portion 503 for periodic self test and/or other diagnostic functions. Furthermore, one or more components of test portion 503, such as high speed serializer 506, may be used for communications functions of integrated circuit 500 as well as for test purposes.

Different aspects and embodiments of the present invention can be implemented, for example, in dedicated hardware, hardware with application specific firmware, software, or a combination thereof, and the test patterns can be generated, for example, with lookup tables or appropriately configured shift registers. At present, it is believed that the patterns set forth herein may be too large for laboratory bit error rate testers (BERTS) and that an embedded circuit implementation may be preferable.

At least a portion of the techniques of the present invention described herein may be implemented in an integrated circuit. In forming integrated circuits, a plurality of identical die are typically fabricated in a repeated pattern on a surface on a semi-conductor wafer. Each die can include an entire circuit or elements as described herein, and can include other structures or circuits. The individual die are cut or diced from the wafer, and then packaged as an integrated circuit. One skilled in the art will know how to dice wafers and package die to produce integrated circuits. Integrated circuits so manufactured are considered part of this invention.

Although illustrative embodiments of the present invention have been described herein, it is to be understood that the invention is not limited to those precise embodiments, and that various other changes and modifications may be made by one skilled in the art without departing from the scope of the invention as set forth in the appended claims.

We claim:

1. A method of generating a modified test pattern for testing communications equipment, said pattern being modified with respect to a baseline pattern having a baseline consecutive identical digit portion with m consecutive identical bits and a baseline pseudo random bit sequence portion with p bits of a baseline pseudo random bit sequence, said method comprising the steps of:

generating a test consecutive identical digit portion comprising n consecutive identical bits; and generating a test pseudo random bit sequence portion comprising q bits of a test pseudo random bit sequence;

wherein:

at least one of said test consecutive identical digit portion and said test pseudo random bit sequence portion is modified with respect to said baseline consecutive identical digit portion and said baseline pseudo random bit sequence portion, respectively, said modification being performed to enhance diagnostic value of said modified test pattern with respect to said baseline pattern; and n is greater than m such that said test consecutive identical digit portion is longer than said baseline consecutive identical digit portion, and such that bit locking ability of said communications equipment may be subjected to a more rigorous test condition via said modified test pattern as compared to said baseline test pattern.

2. The method of claim 1 wherein:
m=72;
p≧10328; and
said baseline PRBS comprises a standard PRBS31 corresponding to output that would be obtained from a thirty-one-stage shift register having twenty-eighth and thirty-first stage outputs added in a modulo-two addition stage with a result of said addition being fed back to a first-stage input.

3. A method of generating a modified test pattern for testing communications equipment, said pattern being modified with respect to a baseline pattern having a baseline consecutive identical digit portion with m consecutive identical bits and a baseline pseudo random bit sequence portion with p bits of a baseline pseudo random bit sequence, said method comprising the steps of:
generating a test consecutive identical digit portion comprising n consecutive identical bit; and
generating a test pseudo random bit sequence portion comprising g bits of a test pseudo random bit sequence;
wherein:
at least one of said test consecutive identical digit portion and said test pseudo random bit sequence portion is modified with respect to said baseline consecutive identical digit portion and said baseline pseudo random bit sequence portion, respectively, said modification being performed to enhance diagnostic value of said modified test pattern with respect to said baseline pattern;
said baseline pseudo random bit sequence and said test pseudo random bit sequence are identical, and
q is less than p, such that said test pseudo random bit sequence portion is truncated with respect to said baseline pseudo random bit sequence portion, and such that said modified test pattern provides a higher frequency toggle rate as compared to said baseline test pattern.

4. The method of claim 3 wherein:
m=72;
p≧10328; and
said baseline PRBS comprises a standard PRBS31 corresponding to output that would be obtained from a thirty-one-stage shift register having twenty-eighth and thirty-first stage outputs added in a modulo-two addition stage with a result of said addition being fed back to a first-stage input.

5. A method of generating a modified test pattern for testing communications equipment, said pattern being modified with respect to a baseline pattern having a baseline consecutive identical digit portion with m consecutive identical bits and a baseline pseudo random bit sequence portion with p bits of a baseline pseudo random bit sequence, said method comprising the steps of:
generating a test consecutive identical digit portion comprising n consecutive identical bits; and
generating a test pseudo random bit sequence portion comprising bits of a test pseudo random bit sequence;
wherein:
at least one of said test consecutive identical digit portion and said test pseudo random bit sequence portion is modified with respect to said baseline consecutive identical digit portion and said baseline pseudo random bit sequence portion, respectively, said modification being performed to enhance diagnostic value of said modified test pattern with respect to said baseline pattern;
said baseline pseudo random bit sequence and said test pseudo random bit sequence are identical, and
wherein q is greater than p, such that said test pseudo random bit sequence portion is stretched with respect to said baseline pseudo random bit sequence portion, and such that said modified test pattern provides a more realistic test, as compared to said baseline test pattern, for conditions wherein long data frames are employed.

6. A method of generating a modified test pattern for testing communications equipment, said pattern being modified with respect to a baseline pattern having a baseline consecutive identical digit portion with m consecutive identical bits and a baseline pseudo random bit sequence portion with p bits of a baseline pseudo random bit sequence, said method comprising the steps of:
generating a test consecutive identical digit portion comprising n consecutive identical bits; and
generating a test pseudo random bit sequence portion comprising q bits of a test pseudo random bit sequence;
wherein:
at least one of said test consecutive identical digit portion and said test pseudo random bit sequence portion is modified with respect to said baseline consecutive identical digit portion and said baseline pseudo random bit sequence portion, respectively, said modification being performed to enhance diagnostic value of said modified test pattern with respect to said baseline pattern; and
said test pseudo random bit sequence comprises a lower order polynomial function than said baseline pseudo random bit sequence, such that said modified test pattern provides a higher frequency toggle rate as compared to said baseline test pattern.

7. The method of claim 6, wherein:
m=72;
p≧10328; and
said baseline pseudo random bit sequence comprises a standard PRBS31 corresponding to output that would be obtained from a thirty-one-stage shift register having twenty-eighth and thirty-first stage outputs added in a modulo-two addition stage with a result of said addition being fed back to a first-stage input.

8. A method of generating a modified test pattern for testing communications equipment, said pattern being modified with respect to a baseline pattern o having a baseline consecutive identical digit portion with m consecutive identical bits and a baseline pseudo random bit sequence portion with p bits of a baseline pseudo random bit sequence, said method comprising the steps of:
generating a test consecutive identical digit portion comprising n consecutive identical bits; and
generating a test pseudo random bit sequence portion comprising q bits of a test pseudo random bit sequence;
wherein:
at least one of said test consecutive identical digit portion and said test pseudo random bit sequence portion is modified with respect to said baseline consecutive identical digit portion and said baseline pseudo random bit sequence portion, respectively, said modification being performed to enhance diagnostic value of said modified test pattern with respect to said baseline pattern; and
said test pseudo random bit sequence comprises a higher order polynomial function than said baseline pseudo random bit sequence, such that said modified test pattern provides a more realistic test, as compared to said baseline test pattern, for conditions wherein long data frames are employed.

9. A method of generating a modified test pattern for testing communications equipment, said pattern being modified with respect to a baseline pattern having a baseline consecutive identical digit consecutive identical digit portion with m consecutive identical bits and a baseline pseudo random bit sequence pseudo random bit sequence portion with p bits of a baseline pseudo random bit sequence, said method comprising the steps of:

generating a test consecutive identical digit portion comprising n consecutive identical bits;

generating a test pseudo random bit sequence portion comprising q bits of a test pseudo random bit sequence;

wherein:

at least one of said test consecutive identical digit portion and said test pseudo random bit sequence portion is modified with respect to said baseline consecutive identical digit portion and said baseline pseudo random bit sequence portion, respectively, said modification being performed to enhance diagnostic value of said modified test pattern with respect to said baseline pattern; and said baseline pattern comprises multiple repetitions of said baseline consecutive identical digit portion and said baseline pseudo random bit sequence portion, said p bits being identical for each repetition and resulting from a re-seeding of said baseline pseudo random bit sequence; and repeating said steps of generating said test consecutive identical digit portion and generating said test pseudo random bit sequence portion, said step of said generation of said test pseudo random bit sequence portion being repeated without re-seeding said test pseudo random bit sequence, such that randomness is effectively introduced into a length of said test consecutive identical digit portion.

10. The method of claim 9 wherein:

m=72;

p≧10328; and said baseline pseudo random bit sequence comprises a standard PRBS31 corresponding to output that would be obtained from a thirty-one-stage shift register having twenty-eighth and thirty-first stage outputs added in a modulo-two addition stage with a result of said addition being fed back to a first-stage input.

11. An apparatus for testing a communications device with a test pattern that is modified with respect to a baseline pattern having a baseline consecutive identical digit portion with m consecutive identical bits and a baseline pseudo random bit sequence portion with p bits of a baseline pseudo random bit sequence, said apparatus comprising:

a pattern generator that is configured to:

generate a test consecutive identical digit portion comprising n consecutive identical bits; and generate a test pseudo random bit sequence portion comprising q bits of a test pseudo random bit sequence;

wherein at least one of said test consecutive identical digit portion and said test pseudo random bit sequence portion is modified with respect to said baseline consecutive identical digit portion and said baseline pseudo random bit sequence portion, respectively, said modification being performed to enhance diagnostic value of said modified test pattern with respect to said baseline pattern;

a checker that is configured to measure performance of the communications device when exposed to said test pattern generated by said pattern generator; and an interface module that is configured to couple the communications device to said pattern generator and said checker;

wherein said baseline pattern comprises multiple repetitions of said baseline consecutive identical digit portion and said baseline pseudo random bit sequence portion, said p bits being identical for each repetition and resulting from a re-seeding of said baseline pseudo random bit sequence, said pattern generator being further configured to repeat said generating of said test consecutive identical digit portion and said generating of said test pseudo random bit sequence portion, said generation of said test pseudo random bit sequence portion being repeated without re-seeding said test pseudo random bit sequence, such that randomness is effectively introduced into a length of said test consecutive identical digit portion.

12. An integrated circuit for communications applications, with built-in test capability using a test pattern that is modified with respect to a baseline pattern having a baseline consecutive identical digit portion with m consecutive identical bits and a baseline pseudo random bit sequence portion with p bits of a baseline pseudo random bit sequence, said integrated circuit comprising:

a communications portion; and a built-in test portion, said built-in test portion in turn comprising:

a pattern generator that is configured to:

generate a test consecutive identical digit portion comprising n consecutive identical bits; and generate a test pseudo random bit sequence portion comprising q bits of a test pseudo random bit sequence;

wherein at least one of said test consecutive identical digit portion and said test pseudo random bit sequence portion is modified with respect to said baseline consecutive identical digit portion and said baseline pseudo random bit sequence portion, respectively, said modification being performed to enhance diagnostic value of said modified test pattern with respect to said baseline pattern;

a checker that is configured to measure performance of said communications portion when exposed to said test pattern generated by said pattern generator; and an interface portion that couples said communications portion to said pattern generator and said checker;

wherein said baseline pattern comprises multiple repetitions of said baseline consecutive identical digit portion and said baseline pseudo random bit sequence portion, said p bits being identical for each repetition and resulting from a re-seeding of said baseline pseudo random bit sequence, said pattern generator being further configured to repeat said generating of said test consecutive identical digit portion and said generating of said test pseudo random bit sequence portion, said generation of said test pseudo random bit sequence portion being repeated without re-seeding said rest pseudo random bit sequence, such that randomness is effectively introduced into a length of said test consecutive identical digit portion.

13. A data structure embodied in a computer readable medium, the data structure used to test a device, the data structure comprising:
- a test consecutive identical digit portion comprising n consecutive identical bits; and
- a test pseudo random bit sequence portion comprising q bits of a test pseudo random bit sequence;

wherein at least one of:
- (i) said test consecutive identical digit portion, and
- (ii) said test pseudo random bit sequence portion is modified with respect to a baseline pattern having:
- (i) a baseline consecutive identical digit portion comprising 72 consecutive identical bits, and
- (ii) a baseline pseudo random bit sequence portion comprising at least 10328 bits of a standard PRBS31 corresponding to output that would be obtained from a thirty-one-stage shift register having twenty-eighth and thirty-first stage outputs added in a modulo-two addition stage with a result of said addition being fed back to a first-stage input, respectively, said modification being performed to enhance diagnostic value of said data structure with respect to said baseline consecutive identical digit portion and said baseline pseudo random bit sequence portion;

wherein said baseline pattern comprises multiple repetitions of said baseline consecutive identical digit portion and said baseline pseudo random bit sequence portion, said bits of said baseline pseudo random bit sequence portion being identical for each repetition and resulting from a re-seeding of said baseline pseudo random bit sequence, said test pseudo random bit sequence portion being repeated in said data structure without re-seeding said test pseudo random bit sequence, such that randomness is effectively introduced into a length of said test consecutive identical digit portion.

14. The data structure of claim 13 where said modification is performed to enhance said diagnostic value with respect to synchronous optical network applications.

15. The data structure of claim 13 where said modification is performed to enhance said diagnostic value with respect to Fibre Channel applications.

* * * * *

UNITED STATES PATENT AND TRADEMARK OFFICE
CERTIFICATE OF CORRECTION

| | | |
|---|---|---|
| PATENT NO. | : 7,272,756 B2 | Page 1 of 1 |
| APPLICATION NO. | : 11/121152 | |
| DATED | : September 18, 2007 | |
| INVENTOR(S) | : Robert D. Brink | |

It is certified that error appears in the above-identified patent and that said Letters Patent is hereby corrected as shown below:

In claim 2, column 7, line 7, "PRBS" should be replaced by -- pseudo random bit sequence --.

In claim 4, column 7, line 45, "PRBS" should be replaced by -- pseudo random bit sequence --.

In claim 8, column 8, line 48, "pattern o having" should be replaced by -- pattern having --.

Signed and Sealed this
Eleventh Day of December, 2012

David J. Kappos
*Director of the United States Patent and Trademark Office*